United States Patent [19]
Gihl et al.

[11] Patent Number: 5,613,115
[45] Date of Patent: Mar. 18, 1997

[54] METHOD FOR USING PLC PROGRAMMING INFORMATION TO GENERATE SECONDARY FUNCTIONS SUCH AS DIAGNOSTICS AND OPERATOR INTERFACE

[75] Inventors: Nicholas T. Gihl, Elmhurst; John R. Skach, Palatine, both of Ill.

[73] Assignee: Total Control Products, Inc., Melrose Park, Ill.

[21] Appl. No.: 804,010

[22] Filed: Dec. 9, 1991

[51] Int. Cl.⁶ .............................. G06F 9/06; G06F 15/46
[52] U.S. Cl. ..................... 395/701; 395/800; 395/376; 364/146; 364/147; 364/926.93
[58] Field of Search ................. 364/DIG. 1, DIG. 2; 395/700

[56] References Cited

U.S. PATENT DOCUMENTS

| | | | |
|---|---|---|---|
| 4,200,915 | 4/1980 | Struger et al. | 395/275 |
| 4,686,623 | 8/1987 | Wallace | 395/700 |
| 4,749,985 | 6/1988 | Corsberg | 340/517 |
| 4,851,985 | 7/1989 | Burror et al. | 364/184 |
| 4,860,203 | 8/1989 | Corrigan et al. | 395/700 |
| 4,989,145 | 1/1991 | Kyushima | 395/700 |
| 5,097,470 | 3/1992 | Gihl | 371/62 |
| 5,113,481 | 5/1992 | Smallwood et al. | 395/2 |
| 5,204,960 | 4/1993 | Smith et al. | 395/700 |

Primary Examiner—Kevin A. Kriess
Assistant Examiner—Lucien Toplu
Attorney, Agent, or Firm—Emrich & Dithmar

[57] ABSTRACT

A programmable logic controller (PLC) in an operating system such as a machine includes a software development tool having labels in a first field to identify and describe specific input/output (I/O) points in the PLC. Each label assignment can be used in the formation of rungs in a ladder logic array to facilitate programming of the PLC. The PLC also allows for the entry of descriptive comments in a second comment field associated with each label assignment to assist the programmer. Secondary function instructions replace the descriptive comments in the comment portion of a label, or in the comment field, to generate a diagnostic, or status, indication such as an alarm for the machine when executed by the PLC. Comments for labels are transformed by a translator, with a file containing the labels and associated comments accessed and scanned for label comments with the appropriate syntax. Secondary function instructions are recognized by the use of specific key words in the comment field. Other functions not part of PLC control of the machine, such as operator interface with the system, may also be programmed into the comment field for performing secondary functions in a manner which facilitates programming of the PLC and makes more efficient use of PLC memory.

17 Claims, 3 Drawing Sheets

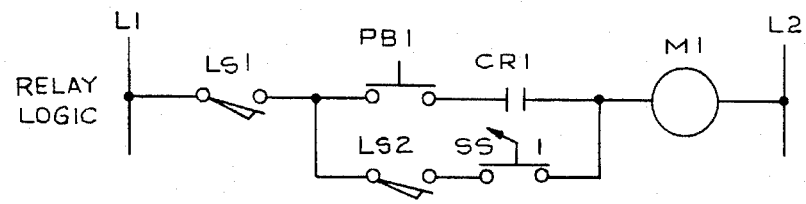
FIG. 1 (Prior Art)
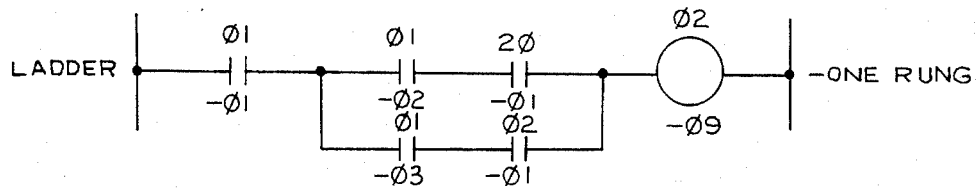
FIG. 2a
FIG. 2b
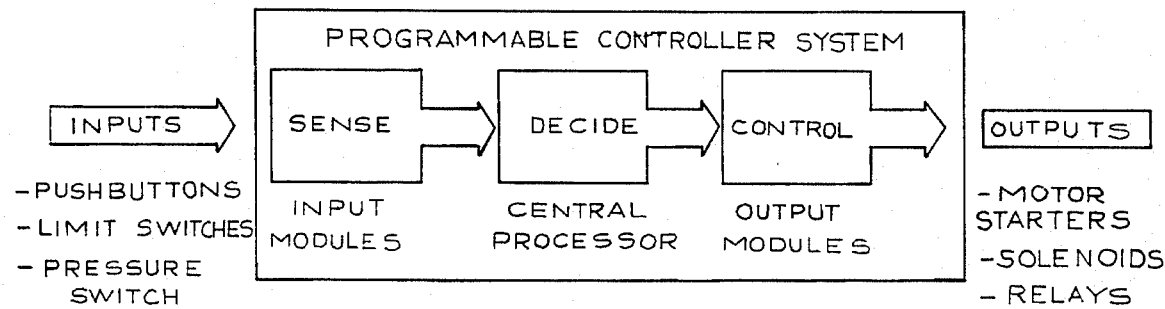
FIG. 3

METHOD FOR USING PLC PROGRAMMING INFORMATION TO GENERATE SECONDARY FUNCTIONS SUCH AS DIAGNOSTICS AND OPERATOR INTERFACE

FIELD OF THE INVENTION

This invention relates generally to digital control of an operating system such as a machine and is particularly directed to the programming of information other than that relating to system control in a programmable logic controller in an operating system.

BACKGROUND OF THE INVENTION

Programmable logic controllers (PLCs) are commonly used in industrial equipment such as assembly lines and machine tools to sequentially operate the equipment in accordance with a control program stored in the controller. The control program is stored in a memory and includes instructions which are read out in rapid sequence to monitor the condition of selected sensing devices, frequently remotely located, on the controlled equipment. These instructions generally activate or deactivate selected operating devices on the controlled equipment as determined by the status of one or more sensors. The typical processor in a PLC rapidly executes programmable controller-type instructions which call for the manipulation of single-bit input data in the control of single-bit output data.

The operating program is loaded into the PLC's memory by means of a programmer which may be in the form of a personal computer (PC). The operating program is in a ladder logic format consisting of a large number of rungs each containing a label which describes a specific input/output (I/O) point within the PLC. The ladder rungs containing the label file are typically referred collectively to as a "label field." Many PLCs are also provided with a second field, commonly referred to as a "comment field." The comment field includes various comments each relating to one of the labels and stored in the same rung as its associated label. Each comment is typically in the form of a short, terse expression and serves as an aid to a programmer in facilitating programmer identification of its associated label. The comments are not used by the operating program which controls the operation of the PLC, but rather allow the programmer, or system user, to describe in some detail a concept associated with a given label which is written as a brief, typically abbreviated, statement.

Referring to FIG. 1, there are shown two examples of the format of programming labels for use in programming a conventional PLC. The label mode allows the assignment of alphanumeric names to any I/O address and storage register address of the PLC. Labels are useful for identifying external I/Os, internal relays, and data registers in terminology relevant to the operator, maintenance personnel and/or programmer. Once programmed, the labels can be displayed with the ladder rungs on a monitor if desired. Each label can consist of 1 to 18 characters in the example of FIG. 1 and is stored in a first label field, or record. If more characters are desired, these may be programmed as a label comment in a second field known as the comment field. A designated symbol, such as a colon in the example of FIG. 1, separates the label and comment fields. As indicated above, the comment following the colon is typically a short, terse expression which serves as an aid in facilitating identification of its associated label. The contents of the comment field has heretofore been ignored and not used by the operating program stored in the PLC. The first comment in FIG. 1 relates to limit switch LS-12, which is stored in memory location 1-01. The label comment "LOCATED ON MACH #2" in the comment field indicates that the label relates to limit switch LS-12 on machine #2. The second programming label shown in FIG. 1 is stored in memory locations 1-16 and relates to motor starter MS-11, with the associated label comment indicating that this label relates to the motor starter MS-11 in the main conveyor.

A PLC makes decisions based on a user-developed control program. The control program is developed using ladder diagram programming. Ladder programming is similar to relay logic diagrams used to represent relay control circuits. Referring to FIGS. 2a and 2b, there are respectively shown simplified examples of a relay logic diagram and the equivalent ladder diagram rung. In the ladder diagram, all inputs are shown as contact symbols and all outputs as coil symbols along with an associated number which is the address. These "address" numbers reference either the location of the external input/output connections to the PLC or the internal relay equivalent address within the PLC. As indicated in the ladder diagram of FIG. 2b, coil 02-09 will be turned ON if either or both of the following is true:

contacts 01-01, 01-02 and 20-01 are closed; and contacts 01-01, 01-03 and 02-01 are closed.

It should also be noted that the flow of continuity is from left to right. Before writing a program, the address numbers for the inputs, outputs and internal relays must be assigned.

Once the operating program is programmed into the PLC either by a programmer or the programming device, additional instructions relating to functions other than those performed by the operating program must be subsequently programmed into the PLC. These additional functions are sometimes referred to as "secondary functions", and they may include functions such as diagnostics for the operating system or an operator interface program including the display of system operating information. Instructions relating to these secondary operations require additional PLC memory and thus indirectly restrict the primary operating program of the PLC. In addition, this multistep programming of the PLC is inefficient and increases required programmer time and operating system expense.

The present invention addresses the aforementioned limitations of the prior art by providing for the simultaneous loading of the operating program into a PLC with any number of secondary programs such as an operator interface program or a systems diagnostic program. The present invention makes more efficient use of programming time as well as PLC memory to simultaneously load operating program instructions as well as secondary function instructions into a PLC.

OBJECTS AND SUMMARY OF THE INVENTION

Accordingly, it is an object of the present invention to expedite and simplify the programming of a programmable logic circuit.

Another object of the present invention to make more efficient use of memory in a PLC by programming a portion of memory heretofore dedicated to the primary operation of the PLC in controlling an operating system such as a machine with secondary function instructions such as relating to system diagnostics, operator interface, etc.

Yet another object of the present invention is to employ an appropriate syntax in programming the comment field of a PLC using designated keywords for performing secondary functions by the PLC such as system diagnostics, operator interface, etc.

A further object of the present invention is to convert label comments in a ladder logic rung by translating the label comments with a designated syntax to a diagnostic or operator interface file and generating diagnostic or operator interface rung structures in a PLC for use by an alarm device, or alarm monitoring software, or for driving an operator interface device such as a video display or computer terminal.

These objects of the present invention are achieved and the disadvantages of the prior art are eliminated by a method for using PLC programming information to generate secondary function instructions such as for diagnostics or operator interface. The inventive method makes use of descriptive comments associated with labels, or aliases, stored in a primary field of the PLC's memory. A typical software development tool allows for the assignment of each label to describe a specific input/output (I/O) point within the PLC, with descriptive comments associated with each respective label stored in a second field. The inventive method transforms statements located in the comment portion of a label into rung information for instructions in a PLC secondary function program. To perform this transformation, a syntax is imposed upon comments for labels associated with a desired condition of the secondary function. Comments for labels not associated with this desired condition do not incorporate the special syntax and are simply ignored. The label is first translated and the rung information is then generated. During label translation, the file containing the labels and associated comments is accessed and scanned for label comments with the appropriate, predetermined syntax. Secondary function instructions are recognized by the use of specific keywords in the comment field. If no diagnostic message for the secondary function is specified in the comment section, one is generated using internal templates. Each secondary function definition is extracted from the comment field and stored in an intermediate file. The intermediate file is also used to store other configuration information as required. The file is used to provide a common format for the secondary function and data obtained from various PLC software tools to be used during the rung generation phase. With the PLC controlling an operating system, the present invention contemplates programming the PLC with such secondary functions as system diagnostics, operator interface, etc.

In a diagnostics application, the rung generation phase uses diagnostic data created by the label translation and stored in a diagnostic file to generate the appropriate rung file for loading into a specific PLC. The generation phase uses internal templates to create standard I/O monitoring, timer, and buffering structures specific to a particular PLC. Each diagnostic is obtained from the diagnostic file and the appropriate rung structures are generated. The message associated with each diagnostic is stored in a separate, indexed file for use by an alarm output device or alarm monitoring software. When the rungs have been generated for each diagnostic, the file is made ready for loading into the PLC that will be monitoring for the fault conditions. While the invention has been described as using PLC programming information to generate diagnostics, it is not limited to use with a diagnostics program for the operating system. For example, the inventive method may also use PLC programming information to generate an operator interface program such as for use with a computer terminal having a video display or with an audio control system for the operator.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 illustrates two examples of programming labels used for identifying external inputs/outputs (I/O's), internal relays, and data registers used in prior art programming of a PLC;

FIGS. 2a and 2b respectively illustrate a relay logic diagram and an equivalent ladder diagram rung such as used in programming a PLC;

FIG. 3 is a simplified schematic diagram of the functions carried out by a PLC in controlling an operating system;

DETAILED DESCRIPTION OF THE PREFERRED EMBODIMENT

A programmable logic controller (PLC) used in controlling an operating system such as a machine senses the on or off status of the inputs (pushbuttons, limit switches, contacts of a relay, etc.) then based on those conditions, makes a decision whether to turn the outputs (motor starters, solenoids, relays, etc.) on or off. As used herein, the term "machine" is intended to include virtually any system or apparatus carrying out an operation or performing a function. The control function carried out by the PLC in controlling a machine is shown in simplified schematic diagram form in FIG. 3. The decisions of the PLC are carried out via the manipulation of registers within the PLC. This manipulation does not occur unless a user-developed control program is stored in the PLC's memory. It is this control program which provides the PLC with a guide as to the use of these registers to satisfy its control function. The control program allows the PLC to carry out various primary functions in controlling the operation of the machine. These primary functions allow the machine to carry out the operations for which it was designed, e.g., machining a piece part, assemblying a component, etc. The PLC also typically controls various secondary functions which are only indirectly related to the primary functions. These secondary functions may include machine diagnostics, user interface control, machine status display and alarm warnings, etc. The present invention is concerned with the manner in which the PLC is programmed to operate in a desired manner in controlling secondary functions of a machine. These secondary functions include all operations not involved with the actual control of the machine. Thus, while the following paragraphs describe the invention primarily in terms of a system diagnostics or a user interface secondary function, the present invention is not limited to programming these two specific secondary functions into a PLC but is adapted for programming virtually any secondary function into a PLC.

Figure 4:
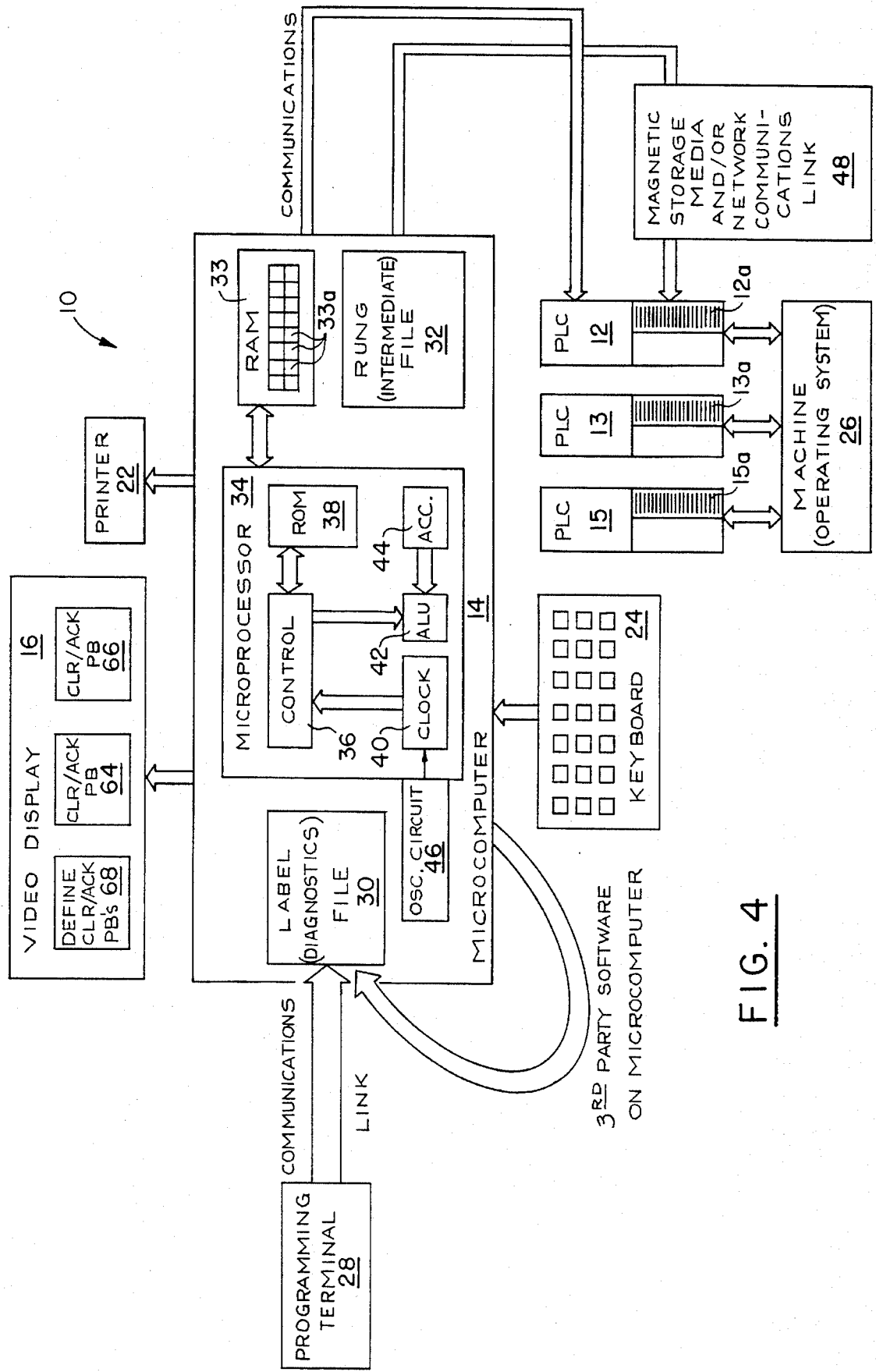
FIG. 4 is a simplified block diagram of a system for programming a PLC to carry out secondary functions in an operating system in accordance with the principles of the present invention.
Figure 5:
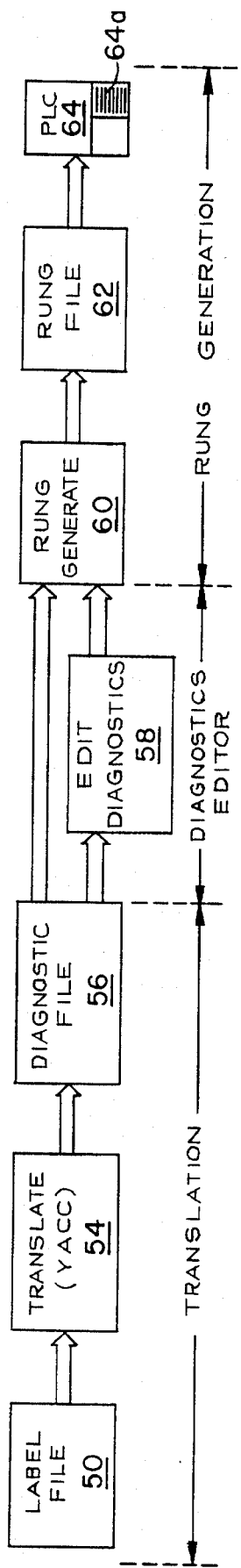
FIG. 5 is a simplified flow chart illustrating the steps involved in programming a PLC to carry out secondary functions in an operating system in accordance with the present invention.

Referring to FIG. 4, there is shown a simplified block diagram of a system 10 for using PLC programming information to generate secondary functions such as involving machine diagnostics or operator interface in accordance with the present invention. FIG. 5 is a simplified flow chart illustrating the steps involved in programming a PLC to carry out secondary functions in an operating system in accordance with the present invention. The PLC programming system 10 includes a microcomputer 14, a video display 16 for providing a user interface in the form of visual indications of the status of a machine 26, and an input device such as a keyboard 24 to allow a user to enter secondary function information into the microcomputer as described below. Microcomputer 14, video display 16 and keyboard 24 may be integrated in the form of a personal computer (PC). A printer 22 may also be coupled to microcomputer 14 for providing a printout of secondary function information as well as primary function information.

Microcomputer 14 includes the combination of a microprocessor 34 and a random access memory (RAM) 32. Microprocessor 34 includes a controller 36, a read-only memory (ROM) 38, a clock 40, an arithmetic and logic unit (ALU) 42, and an accumulator 44. Microprocessor 34 further includes an external oscillator circuit 46 for use as a timing reference. RAM 32 includes a matrix memory 33 comprised of a large number of data storage locations 33a. Secondary function instructions are entered into the RAM 32 either by means of the keyboard 24 or by means of a programming terminal 28 coupled to the microcomputer 14 by means of a communications link. Programming terminal 28 may assume various forms well known to those skilled in the relevant arts and may make use of conventional data storage and loading means such as a magnetic storage medium or an electronic network communications link for loading secondary function instruction information into microcomputer 14. When keyboard 24 is used to enter secondary function instructions, an appropriate program must be loaded into microcomputer 14.

The secondary function instructions are initially stored in a label file 30 within microcomputer 14. The label file 30 includes the aforementioned label field and the comment field containing the secondary function instructions. The secondary function instructions stored in the label file 30 are then translated beginning at step 50 in FIG. 5 followed by a reading at step 52 of a predetermined syntax from RAM 33. At step 54, lexical and syntactical analysis is performed to parse the secondary function instructions and decode in accordance with the predetermined syntax read from RAM 33. By "syntax" is meant the manner in which words are put together to form diagnostic statements including the use of keywords and the order of such keywords in the diagnostic statements. Lexical analysis involves the determination of the words actually used. The syntax is within the process control program which is stored in RAM 33.

The diagnostic file is then converted to a diagnostic rung file at step 60. Provision is also made for editing the diagnostic file at step 58 in generating the diagnostic rung file. The rung file 32 is also stored in microcomputer 14 and is coupled via a communications link to one or more PLC's 12, 13 and 15 each of which includes a respective plurality of registers 12a, 13a and 15a for storing the diagnostic functions within the PLCs. A magnetic storage media and/or electronic network communications link 48 may also be used to load the diagnostic rung file into each of the PLC's 12, 13 and 15. Once the primary and secondary function instructions are loaded into the PLC's 12, 13 and 15, the PLCs serve to control machine 26. While the microcomputer 14 is described as including various memories and files such as the label and rung files 30, 32 and RAM 33 these memories and files would typically be part of the same memory such as a hard disc memory.

The diagnostics set-up routine provides a list of labeled input/output (I/O) registers within each of the PLCs 12, 13 and 15 and their respective shared memory registers 12a, 13a and 15a. For any labeled I/O register which is not paired with a shared memory register, the program provides a "default" register to be used which is highlighted on the video display 16. If the list, as presented, is correct and acceptable (including the program generated default shared memory addresses), a user can accept it by simply clicking "OK" on the video display 16. The I/O shared memory pair (primary and secondary instructions) may be edited directly within RAM 33. Microcomputer 14 loads. the I/O registers Within RAM 33 into the shared memory registers 12a, 13a and 15a Of the respective PLCs 12, 13 and 15.

In order to copy the I/O registers into the shared memories of the PLCs, LET statements are entered into the ladder logic in the form of: LET, S7700=S1234. This statement places the value of I/O register S1234 in RAM 33 into shared memory register S7700 in the PLCs. Complete I/O registers must be copied into the shared memory as the registers may not be broken up into individual bits.

The program stored in RAM 33 allows a user to acknowledge alarm messages either from microcomputer 14 or from a remote operator device, such as a push button (not shown for simplicity). When messages are acknowledged, they are cleared from video display 16 and any other devices which are presenting the message. However, the message remains in a historical log file within microcomputer 14 which is not shown for simplicity. Clear/acknowledge buttons can be defined either within the diagnostics set-up routine or through program labels. Clear/acknowledge push buttons 64 and 66 are associated with message routings. When a push button associated with a particular routing is pressed, the oldest message sent to that routing will be cleared from all the devices on that routing. Each push button may only be associated with one routing. However, multiple push buttons may be associated with the same routings. In addition, push buttons can be defined to clear the oldest message from all devices at once, or to clear all alarm messages in the entire system. To define Clear/Acknowledge push buttons, a "define CLR/ACK PB's" selector 68 is selected from within the video display 16. The I/O address bit of the desired push button is then entered as is the name of the appropriate routing to be cleared. "ALL DEVICES" is then entered to clear the oldest message on all devices, followed by entering of "ALL ALARMS" to clear all alarms in the entire system.

One of the primary benefits of the present invention is that it permits a user to program machine controls in standard ladder logic, and then create diagnostics for the machine in a very simple, straight forward manner. Essentially, the user creates diagnostics by labeling the I/O points which are used within the program controlling machine 26, and then adding easy to understand comments which tell the program how the machine should operate. The program then automatically creates the diagnostic program With straight forward alarm messages, based on these labels and comments. Once these labels and comments are entered, they are included as part of the ladder program as viewed on the video display 16 or printed out on printer 22. The comments created for the program very closely approach natural language and are easily understood so that the program generally will not require additional comments.

To create the secondary function diagnostics, the program labels are used to tell the diagnostics system what the user expects to happen. In order to do this, all I/O points (coils and contacts) to be used for a given machine or operating system must be labeled. If an error message is then to be used to indicate that something in machine 26 is wrong, an appropriate comment is entered with the label which indicates to the program what the user desires to happen. The program label format is as follows: Address, label, comment. In order to explain the present invention, i an example is provided. In the present example it is assumed that there are two I/O points in the PLC. It is further assumed that register S0100, Bit 1 is labeled as the PART CLAMP OUTPUT, and that when this output is turned on, it activates a solenoid. This solenoid (which is not shown for simplicity) clamps a part in place to allow a hole to be drilled in the part. Assuming register S0200, Bit 1, is labeled as the PART CLAMP INPUT, this input is physically connected to a sensor (also not shown for simplicity), which turns on when the part is clamped in place. When the PART CLAMP OUTPUT is turned on, a system user expects the part to be clamped in place. For example, the PART CLAMP INPUT would be expected within a predetermined time limit such as 0.5 seconds. Examples of program labels indicating to the program what is expected to happen are given by the following:

IO0200-01=PART CLAMP INPUT

IO0100-01=PART CLAMP OUTPUT: EXPECT PART CLAMP INPUT WITHIN 0.5 SECONDS.

The underlined words are designated "keywords". The diagnostics program uses these keywords to understand the diagnostics information being programmed. The first keyword is EXPECT. When this keyword follows a colon in a label comment, it tells the program that this I/O point has an associated secondary function and that the secondary function is a "diagnostic trigger statement". The program then reads the diagnostic statement and creates an error message to go with it. The keyword EXPECT must follow immediately after the colon in the label comment field in order for the program to recognize a diagnostic secondary function. Conversely, whenever the program reads the word EXPECT after a colon in the comment field, it assumes that a diagnostic secondary function follows, and declares an error if the following text does not conform to the rules of diagnostic statement.

The next item after EXPECT is the name of the expected "result". In this case, PART CLAMP INPUT is the result which we expect to see after the trigger, PART CLAMP OUTPUT, turns on. As to rendering what the expected result is, the user must tell the program how long to wait for the result before sending an alarm message. This is called the "timeout". The program knows that the timeout period is the number immediately following the keyword WITHIN, which is typically between 0.1 and 30 seconds. The program automatically creates an alarm message to send if the expected result does not occur within the timeout period after the trigger turns on. In the present example, the message would be:

PART CLAMP INPUT DID NOT TURN ON WITHIN 0.5 SECONDS AFTER PART CLAMP OUTPUT TURNED ON.

The underlined text indicates the items that were entered in the diagnostic statement. If, for some reason, the solenoid did not turn on when energized, the program would send this alarm message to a user such as via video display 16.

If, sometime after a trigger event, it is expected that a signal will turn off (0) instead of turn on (1), this can be programmed by entering the keyword OFF after the signal name. For example, where a signal is expected to turn off within 0.2 seconds of a given event, the following entry could be made:

IO1000-10=START SIGNAL: EXPECT BRAKE OUTPUT OFF WITHIN 0.2 SECONDS.

Alternately, one could enter the keywords NOT or NO for the result's name such as, for example:

IO0756-08=RESET TRANS: EXPECT NO TRANS FAULT WITHIN 3 SECONDS, or

IO2454-07=STOP CYCLE: EXPECT NOT READY WITHIN 0.5 SECONDS.

If both NOT or NO are used before the result name and OFF after the result name, the program assumes that the signal is expected to turn-off.

There are some signals which can be expected to be always on or always off. This can be entered in the program by using the keyword ALWAYS, ON and OFF. For example, an entry for an always expected on signal could be:

IO0500-01=MAIN POWER SUPPLY: EXPECT ALWAYS ON.

This tells the program that this signal is always expected to be on, no matter what. Another example would be:

IO3141-13=MOTOR POWER: EXPECT MOTOR OVERLOAD ALWAYS OFF.

This tells the program that the motor overload is always expected to be off whenever the MOTOR POWER signal is active. If either ON or OFF is not entered after the keyword ALWAYS, the program assumes that the signal is expected to be on (1). Typical error messages that the program would generate for these diagnostic statements are:

MAIN POWER SUPPLY TURNED OFF; or MOTOR OVERLOAD TURNED ON WHILE MOTOR POWER WAS ON.

The order in which the words ALWAYS, ON and OFF are entered is not critical. For example, the following diagnostic statements may be used and are treated similar to the above example:

IO3141-13=MOTOR POWER: EXPECT MOTOR OVERLOAD OFF ALWAYS.

IO3141-13=MOTOR POWER: EXPECT NO MOTOR OVERLOAD ALWAYS.

Some diagnostics are more complex than just simple triggers and results. For example, the state of a third signal might determine whether or not the result is an error. The program is capable of recognizing exceptions to the normal trigger and result rules through the use of the keyword UNLESS. When UNLESS follows the timeout period or the keyword ALWAYS, it tells the program not to send out an alarm message if the following signals are true. An example of this is as follows:

IO0214-16=MOVE DRILL: EXPECT FULL DEPTH WITHIN 2 SECONDS UNLESS MANUAL MODE.

Up to three exceptions may be specified within each diagnostic statement. These exceptions are separated by the keyword OR, such as for example:

IO1359-09=CYCLE START: EXPECT MOTOR POWER WITHIN 0.5 SECONDS UNLESS SYSTEM FAULT OR KEY

SWITCH OFF OR MANUAL MODE ON.

As before, the keywords OFF, NOT, NO and ON may be used to indicate the expected state of the exception signals.

The program allows a user to create an alarm message which is then used instead of the default message which the program automatically generates. In some cases, an alarm message may be created which is more useful to the operator than the one produced by the program. To specify an alarm message, the keyword MESSAGE is entered, followed by a message between double quotes: ". . . ". An example of generating an alarm message is given by the following:

IO3421-07=START TRNSFR CMD: EXPECT PART IN PLACE
  WITHIN 1.5 SECONDS, MESSAGE "PART MISSING OR
  MISALIGNED".

If the part is not in place within 1.5 seconds after a transfer is initiated, a user-initiated message will be sent, e.g.:

PART MISSING OR MISALIGNED.

On the other hand, the message the program would have generated and provided if the user had not entered a new message is:

PART IN PLACE DID NOT TURN ON WITHIN 1.5 SECONDS
  AFTER START TRNSFR CMD.

An alarm handler subroutine automatically sends all alarm messages to Default routing. Unless Default routing has been changed through the Alarm Handler Set-Up Screen, the alarms will be sent to the video display 16 and thence to the historical log file. However, up to 99 alternate message routings may be provided for, with any alarm message sent to any of these alternate routings instead of via Default routing. In order to provide for one of these alternate routings, the user must first define and name the alternate routing through the Alarm Handler Set-Up screen on the video display 16. The routing may then be designated for the program by using the keyword ROUTE. For example, a routing diagnostic construction may take the form:

IO0100-01=CLAMP OUTPUT: EXPECT CLAMP INPUT
  WITHIN 0.5 SECONDS, ROUTE EVERYWHERE.

This indicates to the program to send the alarm message for this diagnostic statement to the routing named "EVERYWHERE", which would have been defined through the Alarm Handler Set-Up screen. This rouging may include the video display 16, historical log file, printer 22 and one or more marquee displays. If the keyword ROUTE is not used and routing within the diagnostic statement is not specified, the Alarm Handler automatically sends the alarm message to the Default routing.

Sometimes it is useful to assign different levels of importance to different alarm messages. For example, an error which stops an operating system, or machine, might be considered more important than an error which simply makes the machine cycle slower. The program allows a user to assign priority levels to messages to distinguish their importance. For example, if it is desired to receive only the most important alarm messages, an Alarm Handler's Filter may be used to block the reception of less-important messages. The keyword PRIORITY is used to assign a priority value to a message, with an example of such a priority message given by the following:

IO1012-05=ESTOP: EXPECT ALWAYS OFF, PRIORITY 7.

This indicates to the program to assign a priority value of 7 to the alarm message for this diagnostic statement. If the Alarm Handler's Priority Filters set to a value of 7 or lower, this message would be sent to its normal routing. Priority values may be whole numbers from 1 through 9, with 9 being the highest priority, i.e., the most important. If no priority value is assigned by using the keyword PRIORITY, the program automatically assigns the message a priority value of 1.

Rather than a signal name, an I/O point's actual address may be used within a diagnostic statement. An example of such a diagnostic statement is given by the following:

IO0100-01=PART CLAMP OUTPUT: EXPECT IO0200-01
  WITHIN 0.5 SECONDS.

An address within a diagnostic statement must begin with the letters "IO", as shown in the example the program then recognizes the address and responds to it exactly as it does to signal names. A real address may be used instead of the signal name for results and for exceptions.

Multiple diagnostic statements may be used for any I/O point. The size of available memory is the only practical limit to the number of diagnostic statements stored in the labels. In order to use multiple diagnostic statements with a single trigger I/O point, a colon is added at the end of a first diagnostic statement, with the next diagnostic statement beginning with the keyword EXPECT. For example, multiple diagnostic statements involving receipt of an ENABLE as well as the start of an operating cycle can be expressed as:

IO2468-10=SYSTEM READY: EXPECT SYSTEM ENABLE
  WITHIN 0.5 SECONDS

: EXPECT CYCLE START WITHIN 2 SECONDS

These statements tell a program to expect the SYSTEM ENABLE signal to turn on within 0.5 seconds after SYSTEM READY turns on, and CYCLE START to turn on within 2 seconds if SYSTEM READY turns on. Since the program ignores extra spaces within a diagnostic statement, the text of the diagnostic portion of the label may be aligned in a manner which facilitates user reading of the message. For example, as shown above the second diagnostic statement may be moved over so that it is started in alignment with the first diagnostic statement.

General comments may be incorporated in program labels, either instead of or in addition to diagnostic statements. In order to add a comment, a colon is entered after the label name or at the end of a diagnostic statement, followed by entering of the desired comment. An example of a label with both a diagnostic statement and a comment is given by the following:

IO0100-01=CLAMP OUTPUT: EXPECT CLAMP INPUT
  WITHIN 0.5 SECONDS : THIS OUTPUT TURNS ON A
  SOLENOID WHICH CLAMPS THE PART IN PLACE. THE
  SENSOR SHOULD SEE THE PART CLAMPED WITHIN
  HALF A SECOND.

Comments cannot begin with the keyword EXPECT. Whenever the program detects a keyword as the next text following a colon, it assumes that the following text is a diagnostic statement. The program will report an error if the following text does not follow the rules of diagnostic statements.

It is possible to limit the amount of memory used to store labels and comments by means of a "shorthand" method of entering diagnostic statements. This method uses less memory without limiting the scope of the diagnostics program. There are two differences in this method between that previously described: (1) commas are used instead of some keywords and (2) the information must be entered in a predetermined order. A diagnostic statement may be constructed as follows:

> IO1353-04=SIGNAL NAME: EXPECT<Result name>, <Timeout value>, <1st exception name> OR <2nd exception name> OR <3rd exception name>, <Route name>, <Priority value>, <Graphic ID>, <Message>

An example of this type of shorthand diagnostic statement is given by the following:

> IO0100-01=CLAMP OUTPUT: EXPECT CLAMP INPUT, 0.5

The latter diagnostic statement tells the program to expect the CLAMP INPUT to turn on within 0.5 seconds after the CLAMP OUTPUT turns on, as in the example discussed above. However, the keyword WITHIN has been replaced with a comma and the keyword SECONDS has been completely omitted. This statement uses 15 fewer characters and 15 fewer bytes of memory than the previously discussed diagnostic statement example. In order to reduce memory usage, any of the following keywords may be replaced with a comma:

> WITHIN, SECONDS, UNLESS, ROUTE, ID, or MESSAGE.

However, the keyword EXPECT must be used to begin any diagnostic statement. Also, the keyword OR cannot be replaced with a comma as it must be always used to separate the names of exceptions. When using commas instead of keywords, all information must be in the order given above. When not using some program feature, such as ROUTE, a comma must still be inserted in place of that keyword. An example of this is given by the following:

> IO0214-06=MOVE DRILL: EXPECT FULL DEPTH, 2, MANUAL MODE, 5.

The program treats this diagnostic statement exactly as the following longer diagnostic statement:

> IO0214-01=MOVE DRILL: EXPECT FULL DEPTH WITHIN 2 SECONDS UNLESS MANUAL MODE, PRIORITY 5.

The first statement uses 31 fewer characters and bytes of memory than the second statement. It is not necessary to put spaces before or after the commas. It is also not necessary to put any more commas or keywords than the last program feature used within a diagnostic statement. For example, in the above statement neither the keyword ID nor a comma to represent the keyword Were used. However, it is necessary to put commas before any keywords to use after the timeout period and/or the keyword SECONDS.

A Square D Model 600 processor used in the embodiment described herein has the capability to share common memory locations, or registers. When using a square D Model 600 Processor to perform diagnostics for one or more other Model 600 machine-control processors, the I/O registers to be shared must be copied into the Model 600 shared memory so that the I/O registers can be read by the Diagnostics Processor. This is accomplished by using LET statements within the ladder program. It must also be indicated to the program what Shared Memory registers the I/O registers were copied into, which may be accomplished by means of the Diagnostics Set-Up routine. Shared registers can be reported to the program by labeling Bit 1 of the Shared Memory register with the key label SHARE, followed by the number of the corresponding I/O register. For example:

> IO7700-01=SHARE S143.

This indicates to the program that the Diagnostics Processor can find and monitor any bit in register S143 by looking in Shared Memory register S7700. When the latter program is viewed on the video display 16 or printed out on printer 22, the LET statement will show, this label and the label and the I/O register number can be easily determined to verify that the LET statement has been entered correctly. Complete I/O registers must be copied into the Shared Memory. The registers may not be broken up into individual bits.

There has thus been shown an improved method for programming a PLC with secondary function instructions which are not directly related to control of an operating system, or machine, by the PLC. Examples of such secondary functions are system diagnostics and user interface criteria. Secondary function instructions replace descriptive comments in a comment field of a label used in programming the PLC. The label comments are transformed by a syntax, with a file containing the labels and associated comments accessed and scanned for label comments with the appropriate syntax. Diagnostic statements are recognized by the use of specific keywords in designated positions on the second comment field. Utilizing the comment field for secondary function instructions facilitates programming of the PLC and makes more efficient use of PLC memory.

While particular embodiments of the present invention have been shown and described it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a programmable logic controller (PLC) for implementing primary functions of an operating system, wherein operating program instructions are stored in said PLC and include a first label field and a second comment field, wherein said primary functions implement control functions of said system, the improvement comprising a program for said PLC wherein said first label field includes first instructions for implementing said primary functions in said operating system and said second comment field includes second instructions for implementing secondary functions relating to non-control functions in said operating system:

first memory means for storing a predetermined syntax in said PLC;

further memory means for storing a series of secondary function instructions in said second comment field associated with a given first label field in said PLC;

means for comparing said secondary function instructions with said predetermined syntax; and means for generating a rung file representing programming commands for said PLC if said secondary function instructions include said predetermined syntax;

wherein said rung file is stored in said PLC for programming the operation of said PLC.

2. The improvement of claim 1 wherein said secondary function instructions include keywords for comparison with keywords in said predetermined syntax stored in said PLC.

3. The improvement of claim 2 wherein said secondary function instructions further include said keywords disposed in predetermined locations in each of said secondary function instructions.

4. The improvement of claim 3 wherein said secondary function instructions are directed to diagnostics or user interface for said operating system.

5. The improvement of claim 4 wherein said secondary function instructions further include either an event name or a designated time interval within which an associated event is expected to occur for each of said keywords.

6. The improvement of claim 5 further comprising a designated time interval disposed after its associated event in a secondary function instruction.

7. The improvement of claim 5 further comprising alarm means for indicating to a user when an event does not occur within its designated time interval.

8. The improvement of claim 7 wherein said alarm means includes a video display containing an alarm message.

9. The improvement of claim 8 further comprising means for acknowledging and clearing a displayed alarm message on said video display.

10. The improvement of claim 7 further comprising an exception condition in a secondary function instruction if an event does not occur within its designated time interval.

11. The improvement of claim 7 further comprising means for assigning a priority to each of a plurality of alarm messages.

12. The improvement of claim 5 wherein said of secondary function instructions include a memory address associated with a given event name stored in a memory in said PLC.

13. The improvement of claim 1 further comprising a comment associated with each of said secondary function instructions.

14. The improvement of claim 2 further comprising a designated symbol for each of said keywords to shorten the length of said secondary function instruction.

15. The improvement of claim 1 further comprising a designated symbol separating said label and comment fields.

16. The improvement of claim 15 wherein said designated symbol is a colon.

17. For use with a programmable logic controller (PLC) controlling the operation of a machine through a series of operating instructions stored in a register in said PLC, a method for programming said PLC comprising the steps:

storing a predetermined syntax in a memory of a programmer;

entering an instruction in said programmer;

dividing said instruction into a label field containing an operating instruction and a comment field;

entering a secondary function in said comment field, wherein said secondary function is not involved with control of said machine;

comparing said secondary function with said predetermined syntax;

generating a rung file representing secondary function programming commands for, said PLC if said secondary function includes said predetermined syntax; and loading said rung file into said PLC in programming the operation of said PLC.

* * * * *